United States Patent [19]

Kaneko et al.

[11] Patent Number: 4,726,886

[45] Date of Patent: Feb. 23, 1988

[54] ALUMINUM HEAT EXCHANGER COATING

[75] Inventors: Hideaki Kaneko, Tokyo; Takao Ogino, Kanagawa; Ryosuke Sako, Chiba, all of Japan

[73] Assignee: Nihon Parkerizing Co., Ltd., Tokyo, Japan

[21] Appl. No.: 48,119

[22] Filed: May 11, 1987

[30] Foreign Application Priority Data

May 20, 1986 [JP] Japan ................................ 61-113621

[51] Int. Cl.$^4$ ............................................. C25D 5/50
[52] U.S. Cl. ................................ 204/37.6; 204/38.3; 204/35.1; 148/6.27; 165/42; 165/905; 165/148; 228/101; 228/263.17; 29/157.3 A; 427/337; 427/340; 427/402; 106/14.17; 106/287.1
[58] Field of Search ............... 204/35.1, 38.3, 37.6; 148/6.27, 6.2; 165/42, 905, 148; 123/41.1; 228/101, 263.17; 29/157.3 R, 157.3 A, 157.3 B, 157.3 C; 427/337, 340, 402; 62/323.2; 106/14.17, 287.1

[56] References Cited

U.S. PATENT DOCUMENTS

| | | | |
|---|---|---|---|
| 1,946,153 | 2/1934 | Edwards | 204/37.6 |
| 3,935,349 | 1/1976 | Terai et al. | 148/6.27 |
| 3,989,550 | 11/1976 | Newhard | 148/6.27 |
| 4,404,114 | 9/1983 | Mohr et al. | 106/14.17 |
| 4,549,914 | 10/1985 | Barba | 204/37.6 |
| 4,661,170 | 4/1987 | Osberghaus et al. | 148/6.27 |

FOREIGN PATENT DOCUMENTS 2140033A 11/1984 United Kingdom ............... 204/37.6

*Primary Examiner*—R. L. Andrews
*Attorney, Agent, or Firm*—Arthur E. Kluegel

[57] ABSTRACT

A method for imparting wettability to an aluminum heat exchanger comprises immersing the heat exchanger in an aqueous medium containing a silanol compound and polyvinyl pyrrolidone. If desired, the exchanger may be conversion coated or anodized prior to the immersion.

9 Claims, No Drawings

ALUMINUM HEAT EXCHANGER COATING

BACKGROUND OF THE INVENTION

The present invention concerns a heat exchanger made at least in part of aluminum or its alloys and a method of its fabrication. More specifically, this invention provides a method suitable to use for an evaporator of a cooling/heating system such as evaporator for car air conditioners.

Generally, the heat exchange area of a heat exchanger is designed with as large a surface area as possible, while for the purpose of reducing the size, it is designed with large volume air flow and extremely narrow interfin spacing. For this reason, the atmospheric humidity condenses to form water at the fin interspaces. Water condensation takes place at the cold side of the heat exchanger during either heating or cooling.

Water condensed due to the above-mentioned cause and accumulated in the interfin spaces increases the ventilation resistance, which results in performance degradation. It also leads to rusting of fins giving rise to a problem of pollution due to the disengagement of corrosion products from the surface.

Water condensing in interfin spaces and in the condensation tray tends to be blown off by the heat exchanger air blower and as a result corrodes the periphery of the heat exchanger.

Consequently it is desirable to reduce the amount of water droplets in the interfin spaces so as to avoid fin clogging due to water. For this purpose it is desired to provide the aluminum fin surface with a good hydrophilic property in order to improve its water wettability.

In regard to the method of forming hydrophilic surface on the fins, application of a coating which comprises fine silica particles, silicate, calcium carbonate and aluminum hydroxide sol has been publicly known. However, the adhesion of such inorganic substances in the coating tends to deteriorate as time in service elapses disengaging finely pulverized particles which stimulate the human olfactory organ to yield an unpleasant smell. Further these coatings have a tendency to lower the hydrophilic performance. There is also a method including a resin in the coating of silica etc., in order to prevent the disengagement of silica particles. In many cases, however, the hydrophilic performance tends to lower as resin proportion increases. This comes from the general properties that an organic high molecular resin has, i.e. it is hard for a resin coating to have a contact angle with water lower than 30°, which leads to the difficulty of getting a good water-wettable surface. For this reason, increasing the resin proportion to the extent at which disengagement of inorganic substances may be prevented, makes it hard to attain the desired hydrophilic property. It is also publicly known to make supplementary addition of surfactant to the resin, but surfactant dissolves in water, tends to be washed away and is unfavorable for maintaining the hydrophilic surface at a constant level.

In addition, the surface of aluminum provided with hydrophilic property through the above-mentioned treatments is, in general, apt to corrode in water, and tends to be washed away. Consequently as service time elapses, in many cases the hydrophilic quality is impaired.

Heretofore, chromate conversion treatment has been known as a treatment of aluminum-made heat exchangers for the purpose of corrosion prevention. Chromate conversion coating has water wettability for the initial time period of coating formation. But, since its property changes from hydrophilic to hydrophobic with time, chromate conversion coating cannot be used as a method for hydrophilic surface formation; its function has merely been to provide corrosion resistance. As methods for surface treatment capable of providing corrosion resistance besides chromate conversion treatment, there are anodic oxidation treatment, resin coating treatment etc. which are known to us. However, the coatings obtained with these methods also are hydrophobic.

To mention the method of manufacturing aluminum heat exchangers, there are two methods which have been used. One is cutting to size of aluminum coil, punching and forming, welding for assemblying parts to heat exchanger body which then is subjected to the above-mentioned corrosion resistance surface treatment or to a corrosion resistance surface treatment as a base coat over which then is formed a hydrophilic coating. The other is to use aluminum coil previously surface treated, i.e., so-called precoated aluminum coil, which is cut to size, then subjected to punching/forming. However, the hydrophilic coating formed by these conventional surface treatments is insufficient in durability and gives rise to problems in degradation of the heat exchanging performance and corrosion development. This particularly applies to exchangers to be used for both cooling and heating cycle such as those for a car air conditioner where there is also required reduction of size as well as large air volume. Further in connection with the heat exchanger for a car air conditioner, in many cases assemblying fins and tubes to the unit is done by brazing the joint portions and is followed by chemical conversion treatment and hydrophilic surface treatment. In this case, Al-Si brazing filler metal of high Si content is applied to the fin core metal which in advance is clad with brazing filler metal, after which excessive brazing filler metal is removed by hot water spray; however, there remains on the surface of the aluminum base metal a eutectic of aluminum and silicon, on which chemical conversion coating is difficult to deposit. This results in the corrosion resistance of the fin being insufficient.

The object of the present invention is to provide a heat exchanger made of aluminum which does not give rise to the problem that fine particles scatter around from the surface treatment coating as well as to offer a method for the fabrication of such heat exchanger through which the corrosion resistance and hydrophilic property of aluminum base metal thereof are improved.

SUMMARY OF THE INVENTION

In order to achieve the above-mentioned object, the present invention provides a heat exchanger made of aluminum, wherein aluminum that constitutes tubes and fins is coated on the surface, partly or as a whole, with a coating comprising a compound containing a silanol group (—SiOH) and polyvinyl pyrrolidone. The method for manufacture comprises assemblying tubes and fins formed from aluminum into a unit, dipping the assembled unit into an aqueous medium comprising a compound containing a silanol group (—SiOH) and polyvinyl pyrrolidone followed by drying the assembled heat exchanger body.

DETAILED DESCRIPTION OF THE INVENTION

Examples of compounds having a silanol group are the so-called water glasses consisting of silica ($SiO_2$) and alkali ($Na_2O$, $K_2O$, $Li_2O$, quarternary ammonium though rarely, etc.) and colloidal silica which comprises fine particles of high molecular weight silica dispersed in water. A compound having a silanol group functions as a component that gives the aluminum base metal a hydrophilic property. As such component, colloidal silica is preferable. Also in the present invention, the presence of a compound having a silanol group and polyvinyl pyrrolidone on the outermost surface of aluminum base metal can afford a heat exchanger with less emission of fine powder due to the age deterioration of the coating combined with good water wettability. As polyvinyl pyrrolidone, a compound having a molecular weight of 1,000–500,000 is usable.

When a heat exchanger is used in a mildly corrosive environment, such as in the case of a domestic room air conditioner, a chemical conversion coating having high corrosion resistance is not always required under such circumstances, it is possible to form a hydrophilic coating directly on the bare metallic surface of aluminum. In case it is necessary to provide such a coating with improved corrosion resistance and adhesion, there are the alkaline chromate method, chromium chromate method, chromium phosphate method, zinc phosphate method, and anodizing, all being typical examples of aluminum surface treatment processes. Titanium and zirconium phosphate conversion treatment have been in practical use recently to avoid use of chromium as well as high molecular resin coating processes. These processes are used to form a base coat on aluminum substrate. Out of these methods, chromate conversion coating is most suitable for the reason that uniform coating can best be formed even on the innermost area of the heat exchanger having complicated shape.

Following is an explanation of the examples.

In a serpentine type heat exchanger the tube is typically made of aluminum whose grade is either A1050 or A3003 or one of these grades with a small quantity of Cu, Mn, Fe, etc. Such base metal is extruded and worked to form a flat, multi-pored tube which is then bent to the prescribed serpentine form. The fin is made of aluminum sheet, grade A1050 or A3003 or one of these grades with a small quantity of Sn, Zn, In etc., which is bent/formed to the prescribed form. In joining the fin and the tube, there are two methods: one is to clad brazing filler material of A4004, A4343 or the like on both sides of the fin, and the other is to clad the same brazing filler metal on the tube side as well. The coolant piping is also made of similar aluminum alloys.

The fins and tubes are subjected to brazing, for example by vacuum brazing, to an assembled unit. When needed, there follows chemical conversion treatment such as chromate treatment or anodizing treatment stage, then the surface of the fin is treated to form thereon a coating comprising a silanol compound and polyvinyl pyrrolidone. Tubes and piping do not require as high water wettability as does the fin. Therefore it is not indispensable to form the above-mentioned coating. In view of water condensation that may take place even on the surface of these parts, application of the coating is advisable.

According to the method in the present invention, the assembled heat exchanger, after being subjected to cleaning to remove excessive brazing filler material and similar substances that act against coating formation, is dipped into the conversion treatment or anodizing treatment bath. This is followed by dipping into an aqueous bath that contains silanol compound and polyvinyl pyrrolidone. The temperature of this aqueous bath lies from ambient temperature to 80° C. The time for dipping, in the case of a heat exchanger for car air conditioner, takes in general 10 seconds–3 minutes. The contents of silanol compound and polyvinyl pyrrolidone in the said aqueous solution are in general respectively 1–10 and 1–20 weight %.

Out of the above-mentioned coating, the base coating or anodized base coating yields satisfactory performance when its weight per unit surface area is similar to the value as conventionally employed for aluminum. The coating comprising the silanol compound and polyvinyl pyrrolidone, should be from 0.2 to 2.0 $g/m^2$ in the case of an automobile evaporator, but the value may differ for other uses of the heat exchanger.

In the case of a coating weight less than this lower limit, the coating tends to show inferior effects, while in the case of exceeding the upper limit, the effect does not increase any further, and an economical disadvantage results. These components in the coating are in general, in the proportion of compound having a silanol group 1 part by weight to polyvinyl pyrrolidone 10–0.1 parts by weight.

In the case of higher concentration of the silanol compound, the coating shows a tendency for its fine powder particles to disengage, while, in the coating of lower content in silanol group having compound, its effect decreases and water repellant property due to polyvinyl pyrrolidone tends to take place. Further, in the case of a coating comprising polyvinyl pyrrolidone alone, even the finished one is subject to leaching into water, therefore inferior in the durability and lacks practicality.

As described in the above, after dipping in the aqueous bath containing the silanol compound and polyvinyl pyrrolidone, the work is baked in a hot air oven at a temperature of from 80° to 200° C. The above-mentioned process such as: assembly, cleaning, conversion coating/anodizing, dipping application with the aqueous bath that contains silanol group having compound and polyvinyl pyrrolidone, and baking is applicable not only to the serpentine type heat exchanger but also to all other types such as the accumulation type whose manufacture process is to assemble fins and tubes by brazing, the fin and the tube type, the skived fin type or the spine fin type.

In the fin and tube types and the skived fin type, fins and tubes which are previously clad with brazing filler metal are used.

The structure of the coating on aluminum (the surface of fin) is coated layer by layer, first with a chromium chromate coating and then with the coating comprising the silanol compound and polyvinyl pyrrolidone. The coating of silanol compound and polyvinyl pyrrolidone covers the whole surface (even non-aluminum parts which have not been conversion coated). The chromium chromate conversion treatment is most preferable in view of the corrosion resistance performance. Nevertheless it is also possible to use other known methods such as those based on the alkaline chromate, chromium phosphate, zinc phosphate, titanium and/or zirconium phosphate, anodizing, and the process of resin coating employing chromic acid.

EXAMPLES 1-5

Commercially available chromium chromate coating chemical for aluminum was diluted with water to 72 g/l. The solution bath heated to 50° C. The aluminum-made heat exchanger which was previously cleaned was dipped in the solution for 2 minutes, then water-rinsed and dried. There was formed a chromium chromate conversion coating with about 100 mg/m² as chromium. Five such parts were further coated with each of five aqueous solutions containing about 2 weight % of the mixture which contained a weight ratio of polyvinyl pyrrolidone having approximately 40,000 mean molecular weight: potassium silicate represented in the form of $K_2O.3SiO_2$, of 10:1, 10:3, 10:10, 3:10 and 1:10, respectively. The coating was then dried in a circulating hot air oven at 130° C. for 2 minutes, to form a coating of polyvinyl pyrrolidone and potassium silicate. For evaluating the water wettability of aluminum sheet treated with this process, the contact angle with water was measured using a goniometric contact angle-measurement device. The result is as indicated in Table I. A contact angle lower than 30° indicates good water wettability.

Further, a sheet treated with this process was soaked in running water for about 1 month. The increment of water contact angle after this soaking was almost nil. This signifies that practically no aging deterioration is detectable.

For corrosion resistance performance, a salt spray test according to JIS-Z 2371 was conducted. The result was that the time length to white rust development up to 5% surface area was about 168-240 hours.

COMPARATIVE EXAMPLE 1

As indicated in Table I, a coating of the chromate conversion treatment alone as in the case of Example 1 shows higher water contact angle, i.e. water wettability is lower.

COMPARATIVE EXAMPLE 2

Aluminum sheet with chromate conversion coating according to Example 1 was given a coating consisting of polyvinyl pyrrolidone alone (without containing any potassium silicate as represented in the form of $K_2O.3SiO_2$) in an amount of about 0.6 g/m². The performance was checked by the same method as in Example 1 and the result was that the contact angle with water was 30 degrees. This means that the water wettability is not sufficient. Further, in the running water soak test, the coating of polyvinyl pyrrolidone alone was washed away in about 24 hours and could not endure to maintain its hydrophilic property.

COMPARATIVE EXAMPLE 3

Aluminum sheet with chromate conversion coating formed by the method as in Example 1, was provided with a coating consisting of potassium silicate as represented in the form of $K_2O.3SiO_2$ in an amount about 0.5 g/m².

A heat exchanger made of the aluminum treated with this process, after being soaked in running water for 1 month, was incorporated into a passenger car to monitor the use performance. The result was that potassium silicate was observed to exfoliate and disengage.

TABLE I

| | Composition of treatment Solution - Weight Ratio Resin:Silanol Compound | Defoliation or Disengagement | Coating Weight g/m² | Contact Angle Incipient Period | Contact Angle After Running Water Soak | Corrosion Resistance | Remarks |
|---|---|---|---|---|---|---|---|
| Example 1 | 10:1 | — | 0.6 | 30° | 20° | 168 hrs. | Over chromium chromate coating |
| Example 2 | 10:3 | — | 0.6 | 20° | 20° | 168 hrs. | Over chromium chromate coating |
| Example 3 | 10:10 | — | 0.6 | 10° | 10° | 240 hrs. | Over chromium chromate coating |
| Example 4 | 3:10 | — | 0.6 | <5° | 10° | 240 hrs. | Over chromium chromate coating |
| Example 5 | 1:10 | — | 0.6 | <5° | 10° | 240 hrs. | Over chromium chromate coating |
| Comparative Example 1 | — — | — | — | 10° | 60° | 168 hrs. | Chromium chromate coating alone |
| Comparative Example 2 | 10:0 | — | 0.6 | 30° | 50° | 168 hrs. | Over chromium chromate coating |
| Comparative Example 3 | 0:10 | Yes | 0.5 | 5° | 5° | 240 hrs. | Over chromium chromate coating |
| Example 6 | 3:10 | No | 0.1 | 10° | 20° | 168 hrs. | Over chromium chromate coating |
| Example 7 | 3:10 | No | 0.3 | 5° | 10° | 240 hrs. | Over chromium chromate coating |
| Example 8 | 3:10 | No | 1.0 | 5° | 10° | 240 hrs. | Over chromium chromate coating |
| Example 9 | 3:10 | — | 0.6 | 5° | 5° | 120 hrs. | Over chromium phosphate coating |
| Comparative Example 4 | — — | — | — | 5° | 50° | 72 hrs. | Chromium phosphate coating alone |

Note:
[1]Contact angle: Contact angle with water measured by Goniometric Contact Angle device
Incipient Period: Measurement made within 8 hours after coating formation
Running Water Soak: Measured after soaking in city water for 30 days then drying
[2]Corrosion Resistance: Accordingly to JIS-Z 2371: time to white rusting by salt spray was measured

EXAMPLES 6–8

After chromate coating formation as in Example 1 and application of the mixture solution of polyvinyl pyrrolidone and potassium silicate as used in Example 4, three aluminum sheets were baked in a circulating hot air oven at 120° C. for 30 minutes to form thereon coatings comprising polyvinyl pyrrolidone and potassium silicate, having a coating of 0.1, 0.3 and 1.0 g/m$^2$, respectively.

The performance of heat exchangers made of aluminum sheets treated with the above-mentioned process is indicated in Table I.

Such heat exchangers, after being soaked in running water for 1 month, was incorporated into a passenger car to monitor the use performance. The result was that no exfoliation or disengagement of the coating was observed.

EXAMPLE 9

An aluminum-made car heat exchanger which was previously cleaned was dipped into a 50° C. bath of a commercially available chromium phosphate conversion coating solution. After water-rinsing, it was given about 100 mg/m$^2$ of chromium phosphate conversion coating, followed by the formation thereon of a coating comprising polyvinyl pyrrolidone and potassium silicate as used in Example 4. The performance of aluminum sheet treated with the above-mentioned process is indicated in Table I.

COMPARATIVE EXAMPLE 4

A coating of chromium phosphate alone was formed by the same method as in Example 9. Aluminum sheet with such single coating is indicated for the performance in Table I.

What is claimed is:

1. A method for manufacturing a heat exchanger having aluminum parts wherein the tubes and fins are assembled as a unit, the assembled unit is immersed in an aqueous medium containing a silanol compound and polyvinyl pyrrolidone, and thereafter the assembled unit is dried.

2. The method according to claim 1 wherein the assembly or a fin subassembly unit is, prior to being immersed in the aqueous medium containing silanol compound and polyvinyl pyrrolidone, subjected to a stage of chemical conversion or anodizing treatment.

3. The method according to claim 2 wherein the said unit is assembled by brazing.

4. The method according to claim 3 wherein said brazing is performed by using filler metal which is clad on the surface of the aluminum that constitutes the said fin.

5. The method of claim 1 wherein the aqueous medium contains 1–10 weight % silanol compound and 1–20 weight % polyvinyl pyrrolidone.

6. The method of claim 5 wherein the weight ratio of silanol compound to polyvinyl pyrrolidone is 1:0.1–10.0.

7. The method of claim 1 wherein the amount of applied coating of silanol compound and polyvinyl pyrrolidone is sufficient to yield 0.2 to 2.0 g/m$^2$ of surface area of the heat exchanger surface treated.

8. A heat exchanger comprised at least partly of aluminum and having on the surface thereof a coating containing a silanol compound and polyvinyl pyrrolidone in a weight ratio of 1:0.1–10.

9. The heat exchanger of claim 8 wherein the surface has a conversion coating or anodized coating underneath said silanol compound/polyvinyl pyrrolidone coating.

* * * * *